United States Patent [19]

Kammerman

[11] 4,359,119

[45] Nov. 16, 1982

[54] SPRING-ASSISTED ELONGATED MASS OVER-CENTER SYSTEM

[75] Inventor: Steven B. Kammerman, Langhorne, Pa.

[73] Assignee: New York Development Consultants, Ltd., Bayside, N.Y.

[21] Appl. No.: 36,185

[22] Filed: May 4, 1979

[51] Int. Cl.³ .................................... B62D 33/06
[52] U.S. Cl. ............................ 180/69 R; 49/386; 296/57 A; 296/76
[58] Field of Search ............. 180/69 R; 296/50, 56, 296/57 R, 57 A, 76; 16/66, 70, 65, 82, 84, 85; 49/386, 381, 109–113

[56] References Cited

U.S. PATENT DOCUMENTS

| | | | |
|---|---|---|---|
| 2,569,218 | 9/1951 | Bailey, Jr. | 180/69 R |
| 2,686,340 | 8/1954 | Shepard et al. | 49/386 |
| 2,737,254 | 3/1956 | Bayley | 180/69 R |
| 3,157,240 | 11/1964 | Chew | 180/69 R |
| 3,419,099 | 12/1968 | Brumbaugh et al. | 180/69 R |
| 3,754,613 | 8/1973 | Stephens et al. | 296/57 A |
| 3,765,500 | 10/1973 | Reeves | 180/69 R X |
| 4,090,579 | 5/1978 | Stedman | 180/69 R |
| 4,145,843 | 3/1979 | Lyons | 49/386 |

FOREIGN PATENT DOCUMENTS

| | | | |
|---|---|---|---|
| 688978 | 5/1930 | France | 296/76 |
| 951152 | 4/1949 | France | 296/76 |
| 11508 | of 1907 | United Kingdom | 296/57 A |

*Primary Examiner*—Richard A. Bertsch
*Assistant Examiner*—Donald W. Underwood

[57] ABSTRACT

A method and apparatus for counterbalancing and spring-assisting the swinging movement of a horizontally hinged upwardly extending mass is disclosed wherein a spring (preferably a gas spring) and a mounting bracket or hinge of unique configuration is pivotally attached at one end of the spring, the bracket (hinge) including means for selective engagement and disengagement from the spring during pivotal swinging movement of the mass between alternate terminal positions and through an over-center position, in order to minimize the forces necessary to move said mass toward and through the over-center position.

3 Claims, 10 Drawing Figures

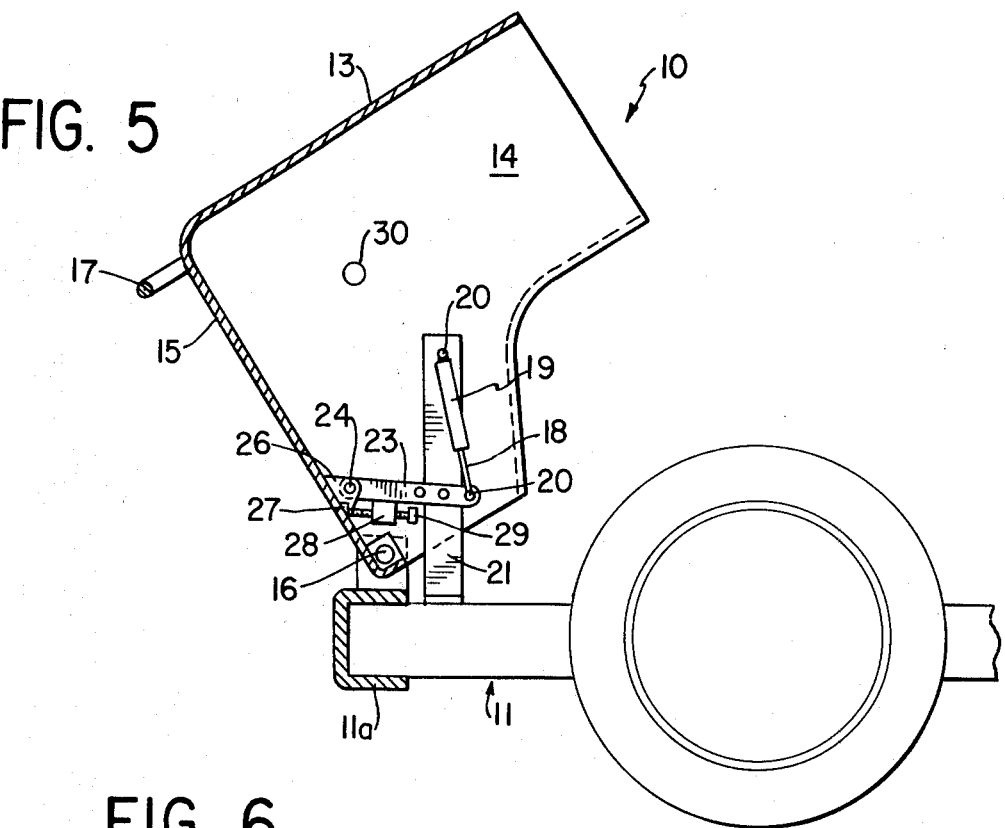
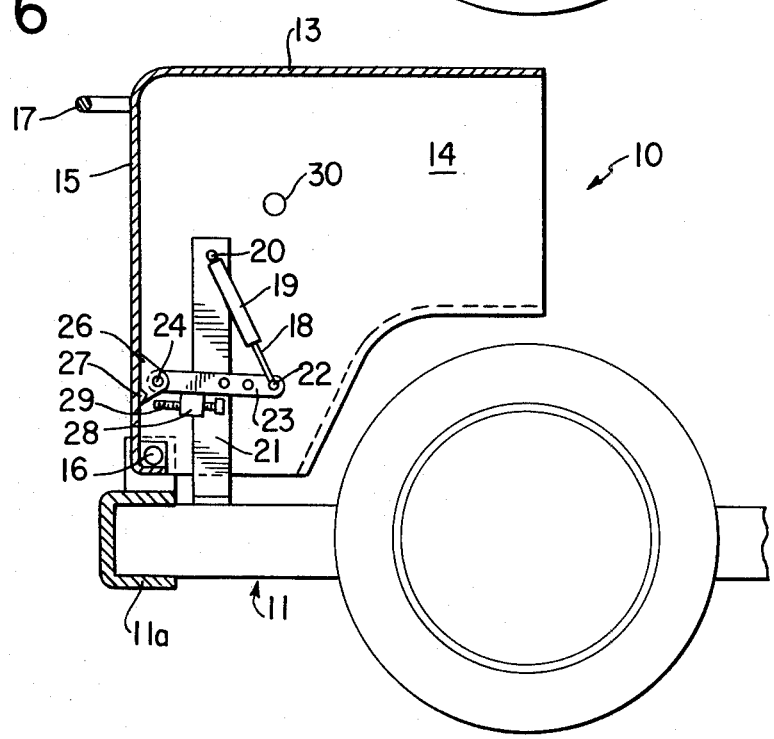

SPRING-ASSISTED ELONGATED MASS OVER-CENTER SYSTEM

BACKGROUND OF THE INVENTION

The present invention concerns spring-assisted movement of hinged elongated objects, particularly objects having great weight hinged at a lower end about a generally horizontal axis, and which extend upwardly therefrom to swing through an overcenter position. In particular, the present invention has applicability to assisting the opening and closing of truck hoods which may weigh from 200 lbs. to 400 lbs. or more. Typically, such truck hoods are opened by swinging forward pivotal movement about a hinge located adjacent to the front bumper, the truck hood (and in some cases a portion of the cab) being progressively tilted forward until the truck engine is fully accessible.

Various attempts have been made to control the movement of truck hoods including the use of springs, levers, hydraulic assists, cables, counterbalances and the like, without satisfactorily balancing and minimizing opening and closing forces while maintaining safety. Due to the great weight which large truck hoods generally have, opening or closing such hoods can be extremely hazardous if the mechanism which controls the hood should fail, causing serious injury and even death. Examples of prior devices of the type mentioned may be found in U.S. Pat. Nos. 3,157,240; 3,419,099; 3,754,613; 3,765,500 and 4,090,579.

It is the purpose of the present invention to disclose a simple yet effective and safe mechanism for controlling the swinging movement of elongated hinged bodies, for example, truck hoods and tailgates having great weight, which greatly minimizes the force necessary to initiate opening or closing of the truck hood and provides a steady force to assist continuous hinged movement of the truck hood between an opened and closed position.

SUMMARY OF THE INVENTION

In accordance with the present invention, there is provided in combination with an elongated mass hinged at its lower end about a generally horizontal axis, said mass extending upwardly therefrom to swing between two terminal positions separated by intermediate over-center positions, spring means for exerting force against said mass to move the mass from one terminal position through the over-center position to the other terminal position and means to disconnect transmission of the spring force prior to the mass having reached the other terminal position.

More particularly, the invention has applicability to movement of a truck hood between open and closed positions separated by an over-center position; or movement of a truck tailgate between such positions. Preferably, the spring means employed will be a gas spring, and in accordance with the invention, means intermediate the gas spring and the truck hood will cause selective discontinuance of the force applied by the gas spring immediately prior to movement of the truck hood to the over-center position from either its opened or closed position, depending upon whether the gas spring is used to assist opening or closing. This is done for two reasons: The truck hood having been rotated with gas spring assisted force from its open or closed position to nearly the over-center position, the force applied by the gas spring is no longer necessary to continue movement of the hood through the over-center position. However, when reverse movement of the hood is desired, because of the unique discontinuance feature mentioned, initial movement of the hood toward and through the over-center position can be made without the additional force required to begin to compress the gas spring.

BRIEF DESCRIPTION OF THE DRAWING

FIG. 5 is the hood of FIG. 4 in intermediate position moving toward an over-center position;

FIG. 6 is the hood of FIGS. 4 and 5 in a fully closed position;

DESCRIPTION OF PARTICULAR EMBODIMENTS

Figure 1:
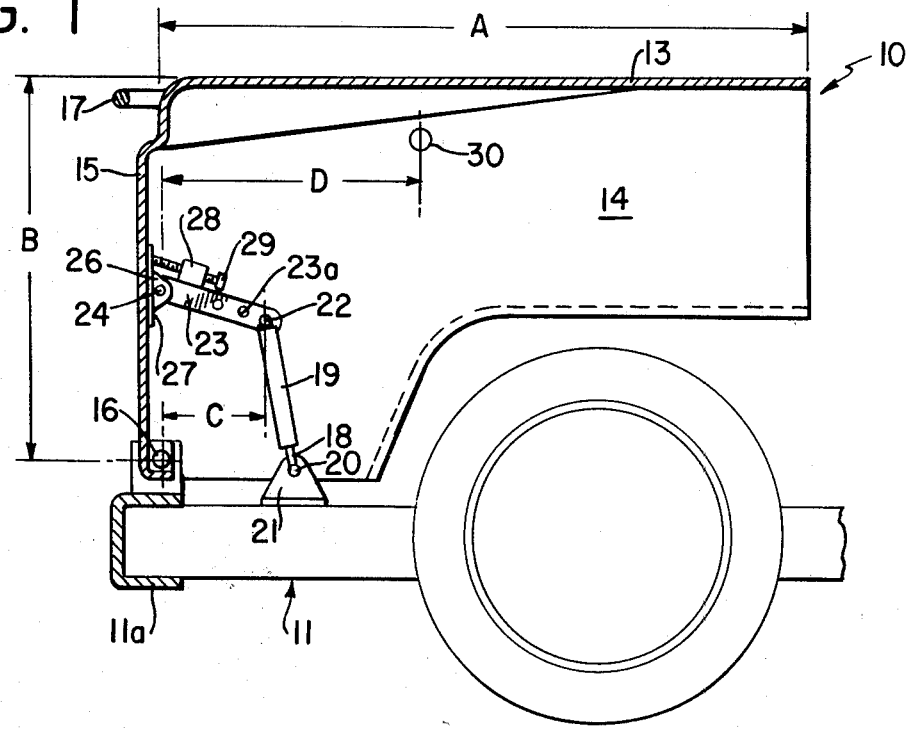
FIG. 1 is a side elevation, partially broken away, of forward portions of a truck and truck hood in closed position incorporating the device of the present invention.

Referring now to the drawing and initially to FIG. 1, the forward portion of a large truck or truck tractor including truck hood 10, chassis or body 11 and further including a device constructed in accordance with the principles of the present invention has been illustrated. In the illustrated embodiment, the hood has a relatively long top section 13, side section 14 and a front or forward section 15 which in the position of FIG. 1 is fully closed and latched to encompass the truck engine (not shown). The hood 10 is hinged at 16 at the lower end of the forward section 15 immediately above and adjacent to the bumper 11a. Accordingly, when the hood release mechanism (not shown) is actuated, the hood 10 can be pulled forward using pull bar 17 to initiate opening movement toward the position of FIG. 2 and finally into the position of FIG. 3.

Before proceeding further with a description of the device of the present invention, it should be mentioned that truck hoods of the type shown frequently weigh over 200 pounds and may in some instances weigh more than 400 pounds. Consequently, without some means to assist the movement of the hood 10 between the terminal positions represented by FIGS. 1 and 3, it would be virtually impossible for a truck driver or mechanic to open and close the hood. It will furthermore be appreciated that if leverage were applied to open the hood 10 and to move it to the position of FIG. 2, and then to the over-center position of FIG. 3, by the time the hood had moved from the position of FIG. 2 to the position of FIG. 3 considerable momentum could be generated without proper control. Because of their great weight, truck hoods can be extremely dangerous when being opened or closed and have in fact caused serious injury and death to individuals who were the victims of improperly designed mechanisms for controlling hood movement.

In accordance with the present invention, there has beed devised a simple yet extremely effective means for controlling the opening and closing of massive truck hoods or more generally, for controlling the movement of elongated objects having large mass which are hinged at a lower end and which swing between alternate terminal positions separated by an overcenter position.

Figure 10:
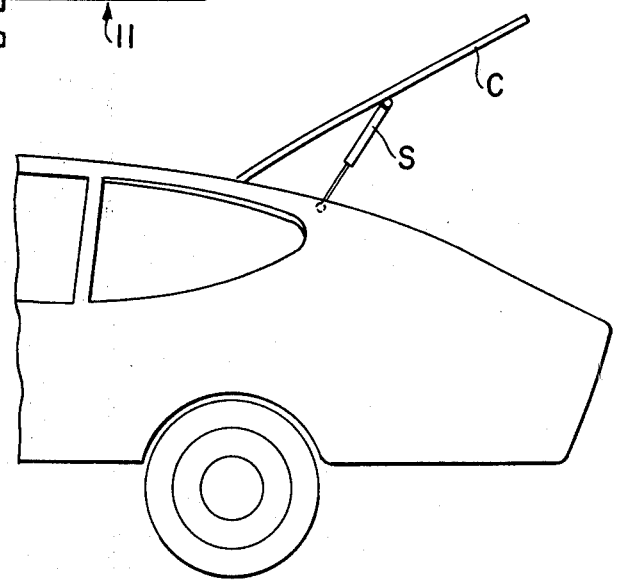
FIG. 10 is a side elevation showing the use of a gas spring in a typical prior art configuration.

In the embodiment of FIG. 1, the extendable, actuating shaft 18 of a gas spring 19 is pivotally attached at 20 to bracket 21 rigidly mounted on one side to the truck frame or chassis 11. A pair of such springs will preferably be employed in combination with the other components of the invention, mounted on each side of the hood for balance. Gas springs have been chosen to implement the present invention because they are more consistent and more linear in the extending force which they produce and the compression force needed than say metallic springs. Gas springs as such for spring-assisting the opening movement of truck covers are known, and one form of such assist has been illustrated in FIG. 10. In this arrangement, gas spring S simply exerts an opening force upon truck lid or cover C upon the release of a truck release mechanism. The mechanisms in U.S. Pat. Nos. 2,569,218 and 2,737,254 are analogous. In each instance, simple push-pull force is applied without consequential balancing of over-center vector forces.

Referring again to FIG. 1, the other end of gas spring 19 uniquely in accordance with the invention is pivotally attached at 22 to hinge arm 23, the opposite end of which is hinged at 24 to a bracket 26 secured to a plate 27 which is mounted to front section 15 of hood 10. Rigidly attached to hinge arm 23 is bolt retainer 28 which threadably receives bolt 29 therein. The end of the bolt 29 may be variably brought into contact with plate 27 in order to vary the geometrical relationship between hinge arm 23, gas spring 19 and the front wall section 15 of the hood. Furthermore, hinge arm 23 is provided with a series of attachment openings 23a for variable attachment of the gas spring 19 to the arm 23. These elements are variable or adjustable to permit "fine tuning" of a given configuration or to permit installation within a range of geometrics. However, when designed for a specific configuration, adjustment or variability should not be needed.

Figure 2:
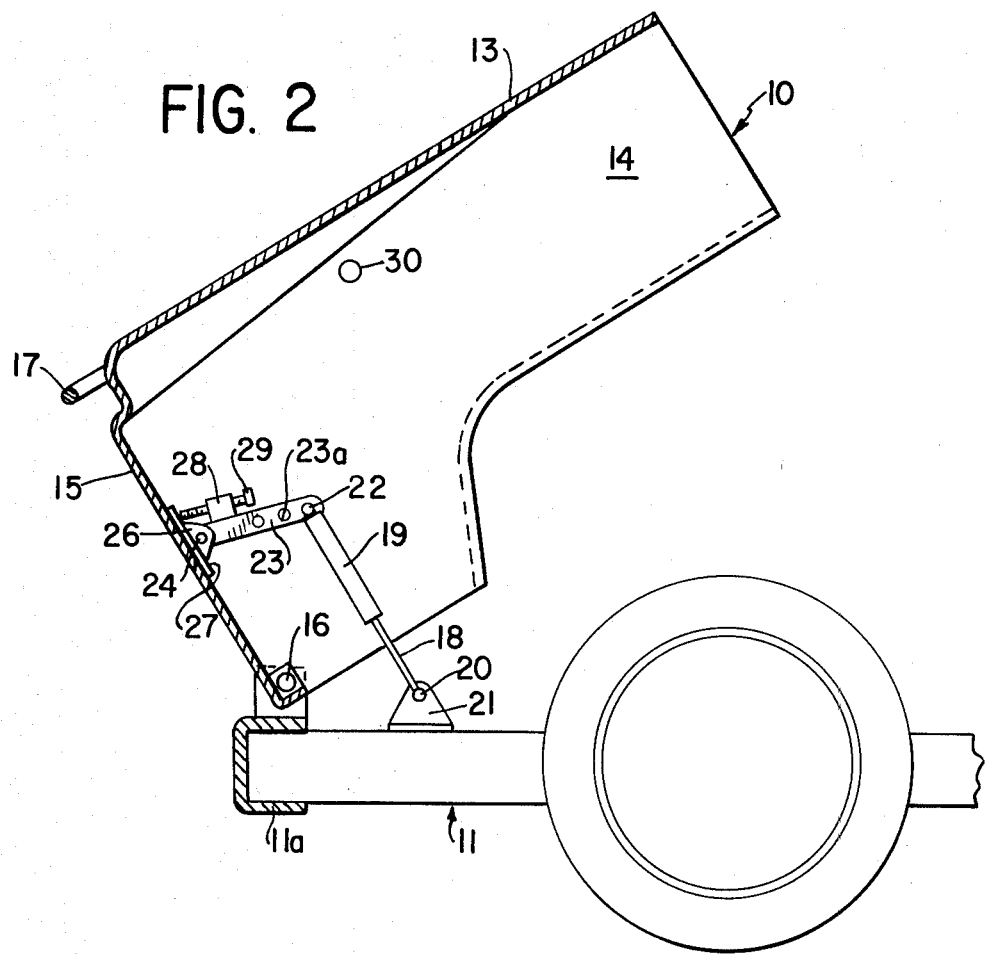
FIG. 2 is a view similar to FIG. 1 in which the truck hood is open and moving toward an over-center position.

In the configuration of FIG. 1, gas spring 19 is substantially fully compressed. Therefore, when the truck hood is released, the gas spring 19 will be free to effect upward rotating pressure upon hood 10 through the agency of hinge arm 23, retainer 28, bolt 29 and plate 27. An example of the force applied to assist in the opening of the hood will be given shortly. For the moment, it should be understood that gas spring 19 (and its counterpart mounted to the opposite side of the chassis) asserts sufficient force with some external assistance provided by a truck driver or mechanic who will pull against bar 17 to initiate opening movement of hood 10 from the position of FIG. 1 toward the position of FIG. 2. During this movement, it will be observed that the center of gravity 30 (FIG. 1) moves forward and closer to the vertical center line bisecting hinge 16. Consequently, at some point, the force applied by gas springs 19 will move the weight of hood 10 entirely unassisted. In the position of FIG. 2, arm 18 of gas spring 19 has become extended and in fact in this position ideally will be very nearly extended. During such extending movement, gas springs 19 assert a rotating force against front section 15 through the agencies of hinge arm 23, retainer 28, bolt 29 and plate 27.

Figure 3:
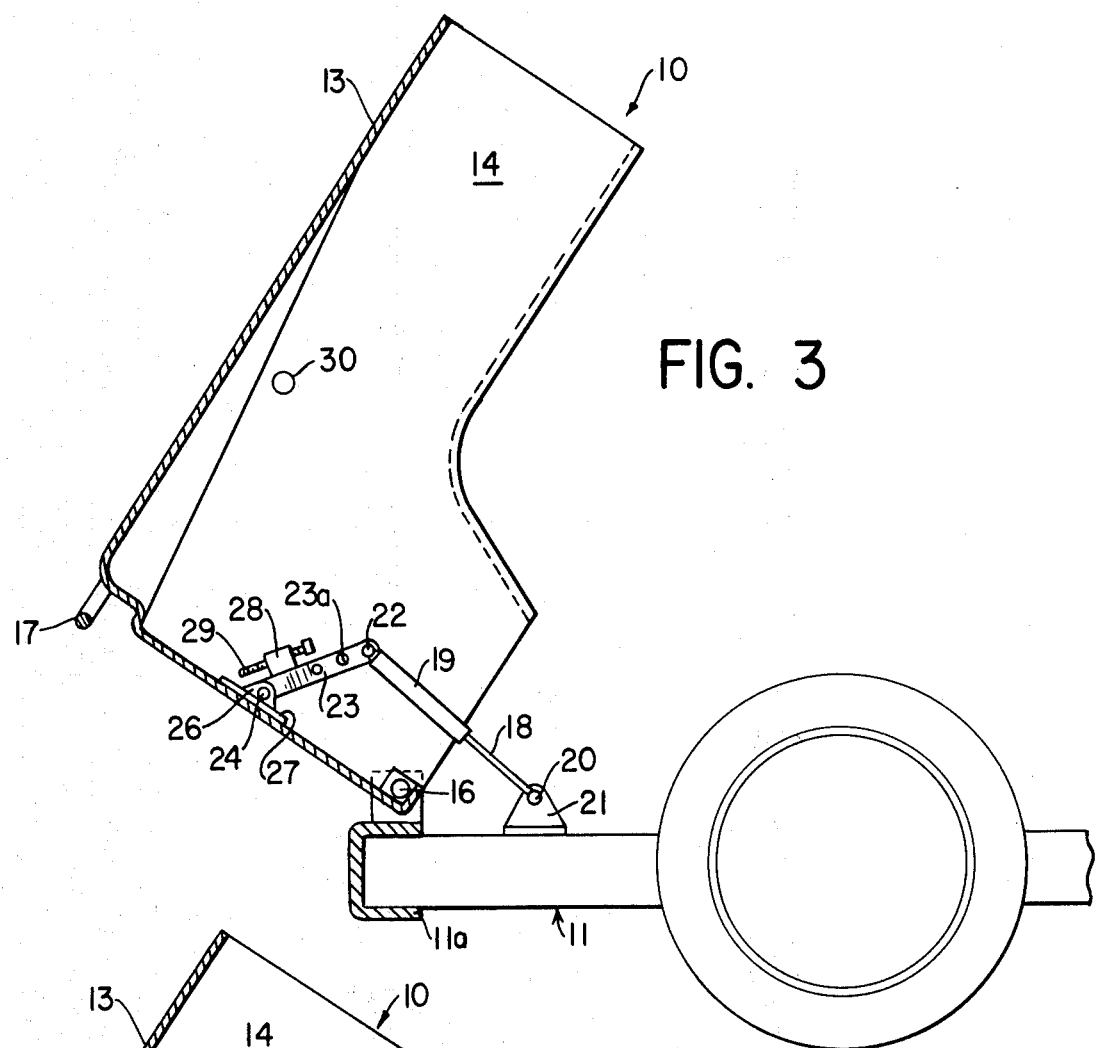
FIG. 3 is a view similar to FIGS. 1 and 2 wherein the truck hood has reached its fully opened position.

However, when the hood has substantially reached the over-center position (not shown) and thereafter until the hood has reached the fully opened position of FIG. 3, the plate 27 will have moved away from the end of bolt 29. Since it is essential for contact to be made between the end of the bolt 29 and plate 27 for the thrusting or pushing force of gas spring 19 to be asserted, it is obvious that at some point (preferably immediately prior to or shortly after the over-center position has been reached), the force applied by gas spring 19 shall be discontinued. There are two fundamental reasons why the actuating force is discontinued. Firstly, the force provided by extension of gas spring 19 is not needed beyond the position of FIG. 2 since by the time hood 10 has been rotated to the position, the momentum of the hood's movement will carry it beyond the over-center position, and to extend the gas spring further would be geometrically difficult. Secondly, when the hood 10 is moved in the opposite direction (from the fully opened position of FIG. 3 to the position of FIG. 2), during initial closing movement of the hood, no force will be required to compress the gas spring 19 since during such initial movement, no contact will exist between the end of bolt 29 and plate 27. Ideally, such contact will only begin during the return mode shortly before the position of FIG. 2 since at this point the center of gravity 30 has passed over-center vis-a-vis hinge 16 and consequently can be used to assist any external force applied to the hood in compressing gas spring 19. It is this selective discontinuance of the spring force and correlative selective application of the connection between the gas spring and the object to which it is attached which permits the device of the present invention to counterbalance, in a broad sense, the movement of an elongated massive object such as a truck hood when it swings between two alternate terminal positions separated by an overcenter position.

In order to fully appreciate how the device of the present invention may operate, by way of example, let us say truck hood section 13 may have a length A of say 70 inches, section 15 a length B of 40 inches from hinge 16; and in the fully closed position of FIG. 1, the center of gravity (say 200 pounds) is at a distance D of 30 inches from a point vertically intercepting hinge 16. The distance C from the aforementioned vertical intersection horizontally to pivotal attachment 22 let us say is 12 inches. Applying these figures, the force necessary to effect initial opening of hood 10 about hinge 16 is a product of its center of gravity (200 pounds) and the distance (D×30 inches), or 6000 inch/pounds. If we provide two gas springs 19 having an extending force of 200 pounds, we will achieve effectively twice 200 pounds×12 inches (distance C), or 4800 inch/pounds as an initial actuating force opposing the initial opening force of 6000 inch/pounds. The difference between these two values is 1200 inch/pounds, and since pull bar 17 is 40 inches above hinge 16, dividing 40 inches into 1200 inch/pounds results in an initial additional required force of 30 pounds in order to increase the gas spring assisted force to the value of 6000 inch/pounds.

It is easily seen that any person could quite readily assert a force of 30 pounds against pull bar 17.

During the opening mode, it will be seen with reference to FIG. 2 that center of gravity 30 has shifted closer to the over-center position. In the position of FIG. 2, let us say that center of gravity 30 has moved within 12 inches of the vertical over-center position. The force necessary to effect further rotary movement about hinge 16 is thus the product of the center of gravity (200 pounds) and the distance, 12 inches, resulting in a force of 2400 inch/pounds. At this point, pivot point 22 has moved somewhat closer to the vertical or the center position and is let us say 10 inches therefrom. Gas springs 19 (two in number) are still substantially extending with a force of 200 pounds. The combined force of both gas springs would therefore be 10 inches×200×2 equalling 4000 inch/pounds. The difference between the force provided by gas springs 19 and the force required in the position of FIG. 2 is 1600 inch/pounds in excess of the amount required. In other words, as the hood 10 opens from the position of FIG. 1 to the position of FIG. 2, the force necessary to effect continued opening movement as applied to pull bar 17 rapidly is reduced to a point where gas springs 19 are producing an excess of force. In operation, this would permit the operator to "turn over the job" of hood opening to the gas springs shortly after providing the initial assist of 30 pounds.

It is also clear from what has been said that in the position of FIG. 3, with the center of gravity to the left of the vertical line intersecting the hinge 16, that the hood 10 will naturally seek a point of equilibrium in the open position (a stop, not shown, would be provided). In other words, with the center of gravity in the position of FIG. 3, the hood 10 will tend to remain open until a force is applied to return it to the closed position. Again, using the values proposed, if the center of gravity 30 in the position of FIG. 3 is say 5 inches to the left of center viewed in FIG. 3, the force necessary to rotate the entire hood clockwise would be 5 times 200, or 1000 inch/pounds. If we divide this value by the length of the arm from hinge 16 to bar 17, i.e., 40 inches, we find that in order to initiate closing movement of the hood 10, a force of only 25 pounds need initially be applied. Again, this force is so small that it is easily seen that any person could apply such a force. The reason why it is possible for the return force to be of such a low magnitude is because no force is initially required to compress springs 19 due to the lack of contact between bolt 29 and plate 27 during the initial closing movement of hood 10. If, for example, it were necessary immediately to begin to compress springs 19, an additional force would be required of 2400 inch/pounds which when divided by the distance 40 would require an additional force of 50 pounds. The total initial closing force would therefore be 75 pounds which would present considerable effort for many people. Furthermore, this force would be considerably greater and in fact would be impossible to achieve with larger, heavier truck hoods.

Figure 4:
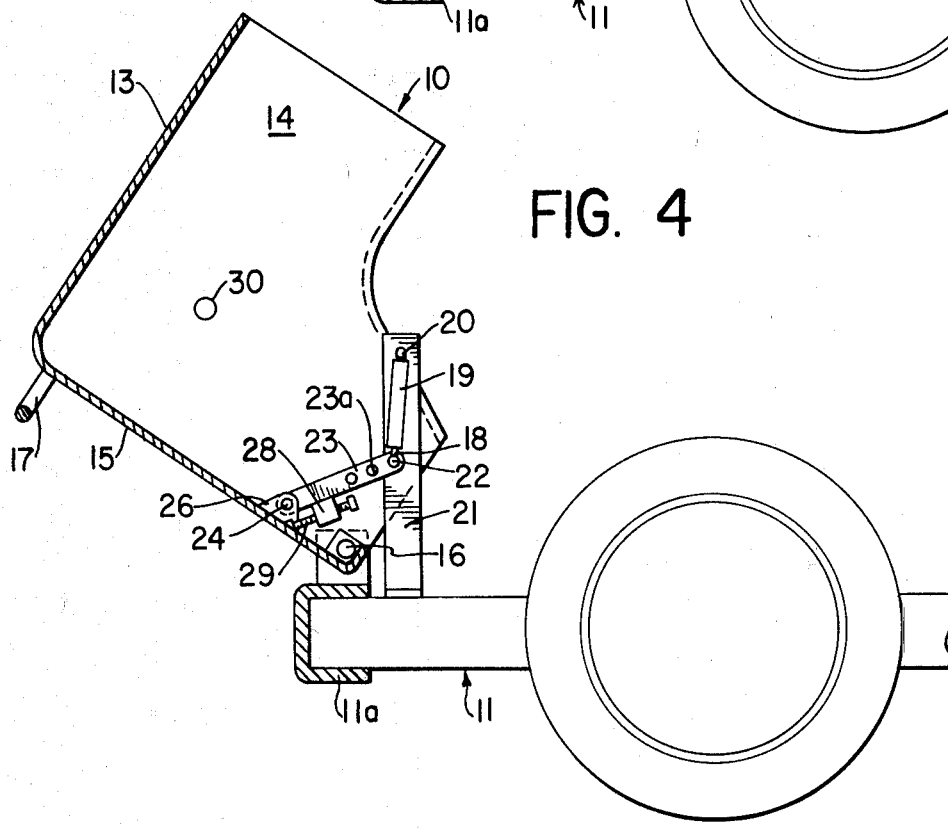
FIG. 4 is an alternate embodiment of the present invention incorporating a shorter hood having a relatively higher center of gravity than the configuration of FIGS. 1–3 and wherein the hood is in its fully opened position.

An alternate environment in which the present invention can be used is illustrated by FIGS. 4–6. In this embodiment, the parts are identical with the parts just described in connection with FIGS. 1–3; and the same reference numerals are used; however, section 13 and side sections 14 are relatively shorter than the corresponding sections of FIGS. 1–3 and consequently the center of gravity 30 is somewhat differently located. In the embodiment of FIGS. 4–6, it will be found that because the center of gravity 30 in the fully opened position is displaced to a considerable extent from the vertical or over-center position, a far greater force is needed to initiate closing movement than will be needed to initiate opening movement. In other words, whereas in the embodiment of FIGS. 1–3 the device of the invention is installed to assist opening movement, in the case of the embodiment of FIGS. 4–6, the device of the present invention is installed to assist closing movement. Accordingly, in the fully opened position of FIG. 4, gas springs (two in number) are fully compressed and the arms 18 thereof assert à downward rotary pulling force through the agency of arms 23 and bolt 29 in order to assist rotary movement of the hood 10 about hinge 16. The magnitude of the force applied by gas springs 19 will be selected, of course, in relationship to the value of center of gravity 30 and its distance from the over-center position to permit a relatively small additional force to cause closing movement.

As shown in FIG. 5, the center of gravity is approaching, but has still not reached the over-center position, and it will be seen that springs 19 continue to apply closing force against hood section 15. However, in the position of FIG. 6, the end of bolt 29 has completely become disengaged with respect to plate 27 once the center of gravity 30 has travelled over-center, and the hood closes of its own weight and momentum. Following the teachings and the example of FIG. 1, it will be understood that both the opening and closing forces can be selected to be within a few pounds of each other. It should also be noted that the arrangement of FIGS. 4–6 would apply as well to assisting the closing of a truck tailgate having a similar hinged movement and center of gravity.

Figure 7:
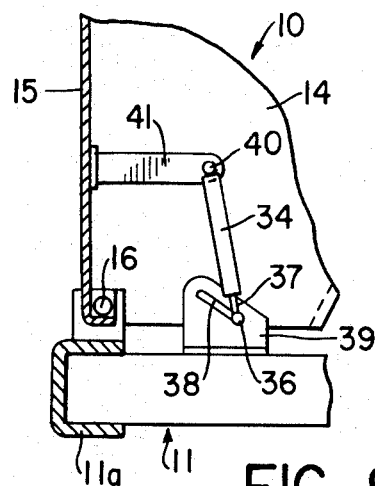
FIG. 7 is an alternate embodiment of the present invention incorporating a truck hood similar to FIG. 1.
Figure 8:
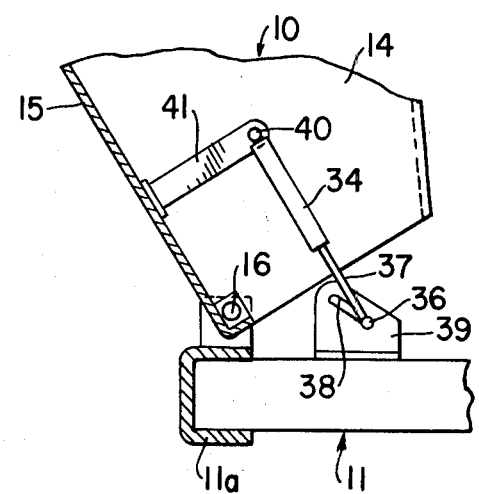
FIG. 8 is said alternate embodiment with the truck hood in an intermediate position.
Figure 9:
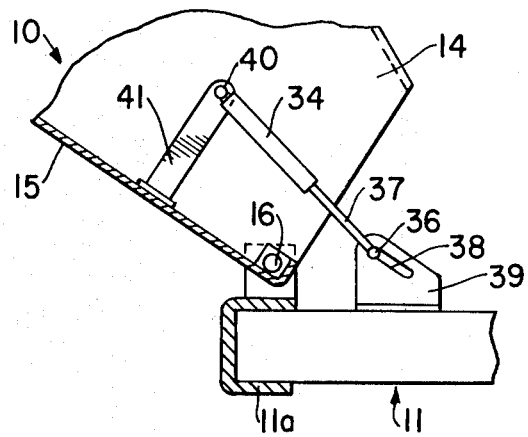
FIG. 9 is said alternate embodiment with the truck hood in its fully opened position.

FIGS. 7–9 illustrate still another construction of the device of the present invention. In the embodiment of FIGS. 7–9, a gas spring 34 or a pair of gas springs as may be required are mounted by having the end 36 of the extending or actuating arm 37 thereof travel in a slide 38 within mounting bracket 39. The latter is fixed to truck chassis 11. The upper end of spring 34 is pivotally connected at 40 to arm 41 rigidly attached at its opposite end to front hood section 15. The configuration shown is essentially analogous to the (assist opening) configuration of FIGS. 1–3 and the bracket 39 with its slide 38 is analogous to hinge arm 23 and bolt 29. Accordingly, as will be seen from the sequence of FIGS. 7–9, initial extension of gas spring 34 will cause rotation of hood 10 counterclockwise about hinge 16 with the end 36 of arm 37 remaining at the lower end of slide 38. However, when the center of gravity of hood 10 has reached the over-center position, the end 36 of arm 37 is free to move upwardly in slide 38, thus discontinuing any force producing effect. Upon return counterclockwise movement of the hood toward its closed position, arm 37 and end 36 thereof will travel for a selected distance within slide 38 permitting the center of gravity to pass over the center before compression of gas spring 34 begins.

It will be understood that the foregoing description has been of particular embodiments which the invention may assume and is therefore merely representative. In order to appreciate the scope of the invention, reference should be made to the appended claims.

I claim:

1. In combination with a forward portion of a truck body, a truck hood having in a closed position a vertical component and a horizontal component, said hood being hinged adjacent to the lower end of said vertical component to the forward end of said body so that said hood when opened will swing from its closed position through an over-center position to a forward open position, the improvement comprising gas spring means, means for mounting one end of said gas spring means to said truck body and the other end of said gas spring means to a means interconnecting said gas spring with said truck hood, said hood having open and closed terminal positions, said gas spring means being compressed when the truck hood is in one of said terminal positions such that said gas spring means will assist movement of said truck hood from one terminal position toward the over-center position, said means interconnecting the gas spring means and the truck hood is a hinge arm pivotally connected at one end to the gas spring and pivotally connected at the other end to the truck hood, stop means connected to said arm, said stop means preventing relative rotation of said arm with respect to said truck hood until said truck hood moves substantially into an over-center position, and thereafter said stop means permitting relative rotation of said arm with respect to said truck hood to discontinue transmission of force from said gas spring to said truck hood.

2. The combination according to claim 1 wherein said stop means may be adjusted to vary said relative rotation and means for varying the length of said hinge arm from its pivotal connections with said gas spring and said truck hood.

3. In combination with a forward portion of a truck body, a truck hood having in a closed position a vertical component and a horizontal component, said hood being hinged adjacent to the lower end of said vertical component to the forward end of said body so that said hood when opened will swing from its closed position through an over-center position to a forward open position, the improvement comprising spring means, means for mounting one end of said spring means to said truck body and the other end of said spring means to a means interconnecting said spring with said truck hood, said hood having open and closed terminal positions, said spring means being compressed when the truck hood is in one of said terminal positions such that said spring means will assist movement of said truck hood from one terminal position toward the over-center position, said means interconnecting the spring means and the truck hood is a hinge arm pivotally connected at one end to the spring and pivotally connected at the other end to the truck hood, stop means connected to said arm, said stop means preventing relative rotation of said arm with respect to said truck hood until said truck hood moves substantially into an over-center position, and thereafter said stop means permitting relative rotation of said arm with respect to said truck hood to discontinue transmission of force from said spring to said truck hood.

* * * * *